US009446638B2

(12) United States Patent
Tanno

(10) Patent No.: US 9,446,638 B2
(45) Date of Patent: Sep. 20, 2016

(54) WHEEL AND AIR PRESSURE ADJUSTING DEVICE

(71) Applicant: The Yokohama Rubber Co., Ltd., Minato-ku, Tokyo (JP)

(72) Inventor: Atsushi Tanno, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/380,061

(22) PCT Filed: Feb. 12, 2013

(86) PCT No.: PCT/JP2013/053279
§ 371 (c)(1),
(2) Date: Aug. 20, 2014

(87) PCT Pub. No.: WO2013/125395
PCT Pub. Date: Aug. 29, 2013

(65) Prior Publication Data
US 2015/0007920 A1 Jan. 8, 2015

(30) Foreign Application Priority Data
Feb. 21, 2012 (JP) .................................. 2012-035322

(51) Int. Cl.
B60C 23/10 (2006.01)
B60C 29/02 (2006.01)
B60B 1/12 (2006.01)
B60B 3/00 (2006.01)
B60C 23/00 (2006.01)
B60B 19/08 (2006.01)
B60C 23/04 (2006.01)
B60B 3/02 (2006.01)

(52) U.S. Cl.
CPC .................. B60C 29/02 (2013.01); B60B 1/12 (2013.01); B60B 3/002 (2013.01); B60B 19/08 (2013.01); B60C 23/003 (2013.01); B60C 23/04 (2013.01); B60C 23/10 (2013.01); B60B 3/02 (2013.01)

(58) Field of Classification Search
CPC ............................................. B60C 23/003
USPC ................................. 152/416, 417
See application file for complete search history.

(56) References Cited

U.S. PATENT DOCUMENTS 4,019,552 A * 4/1977 Tsuruta ........................ 152/417
4,154,279 A * 5/1979 Tsuruta ........................ 152/416
4,431,043 A * 2/1984 Goodell et al. ............... 152/417
(Continued)

FOREIGN PATENT DOCUMENTS

DE 44 08 140 10/1995
JP 2006-123858 5/2006
(Continued)

OTHER PUBLICATIONS

International Search Report dated Apr. 16, 2013, 4 pages.

Primary Examiner — Jeffrey J Restifo
(74) Attorney, Agent, or Firm — Thorpe North and Western

(57) ABSTRACT

A wheel is configured by attaching a rim and a hub mounting part via an attaching portion. The wheel has a pneumatic tire mounted on the rim, and is mounted on the vehicle hub by the hub mounting part. The wheel comprises an air passage that penetrates through the attaching portion and opens on the outer circumferential surface of the rim and the mounting surface of the hub mounting part. The wheel also comprises a plurality of air passages that are mutually independent.

28 Claims, 6 Drawing Sheets

(56) References Cited

U.S. PATENT DOCUMENTS

| | | | |
|---|---|---|---|
| 4,582,107 A * | 4/1986 | Scully | 152/417 |
| 4,892,128 A * | 1/1990 | Bartos | 152/417 |
| 5,080,156 A * | 1/1992 | Bartos | 152/417 |
| 5,080,157 A * | 1/1992 | Oerter | 152/417 |
| 5,094,263 A * | 3/1992 | Hurrell et al. | 137/224 |
| 5,174,839 A * | 12/1992 | Schultz et al. | 152/415 |
| 5,203,391 A * | 4/1993 | Fox | 152/416 |
| 5,221,381 A * | 6/1993 | Hurrell, II | 152/416 |
| 5,253,688 A * | 10/1993 | Tigges | 152/417 |
| 5,546,308 A * | 8/1996 | Yamamoto | 701/93 |
| 5,587,698 A * | 12/1996 | Genna | 340/442 |
| 6,145,559 A * | 11/2000 | Ingram, II | 152/417 |
| 6,199,611 B1 * | 3/2001 | Wernick | 152/417 |
| 6,244,316 B1 * | 6/2001 | Naedler | 152/417 |
| 6,719,028 B2 * | 4/2004 | D'Amico et al. | 152/415 |
| 7,207,365 B2 * | 4/2007 | Nelson et al. | 152/417 |
| 7,690,412 B1 * | 4/2010 | Jenkinson et al. | 152/416 |
| 7,931,061 B2 * | 4/2011 | Gonska et al. | 152/417 |
| 8,052,400 B2 * | 11/2011 | Isono | 417/233 |
| 8,474,500 B2 * | 7/2013 | Caretta et al. | 152/509 |
| 8,915,274 B2 * | 12/2014 | Eschenburg et al. | 152/416 |
| 2002/0112802 A1 * | 8/2002 | D'Amico et al. | 152/415 |
| 2005/0205182 A1 * | 9/2005 | Maquaire et al. | 152/417 |
| 2005/0236083 A1 * | 10/2005 | Wang et al. | 152/415 |
| 2007/0187015 A1 * | 8/2007 | Alff | 152/418 |
| 2008/0127773 A1 * | 6/2008 | Solie et al. | 74/606 A |
| 2008/0149243 A1 * | 6/2008 | Resare et al. | 152/415 |
| 2009/0000716 A1 | 1/2009 | Isono | |
| 2009/0101261 A1 * | 4/2009 | Collet et al. | 152/417 |
| 2009/0266460 A1 * | 10/2009 | Resare et al. | 152/417 |
| 2009/0283190 A1 * | 11/2009 | Padula et al. | 152/417 |
| 2009/0283191 A1 * | 11/2009 | Isono | 152/419 |
| 2009/0311112 A1 * | 12/2009 | Isono | 417/233 |
| 2010/0147429 A1 * | 6/2010 | Gonska et al. | 152/417 |
| 2010/0170605 A1 * | 7/2010 | Isono | 152/419 |
| 2010/0181739 A1 * | 7/2010 | Eschenburg et al. | 280/124.125 |
| 2010/0230023 A1 * | 9/2010 | Isono | 152/416 |
| 2012/0234447 A1 * | 9/2012 | Narloch et al. | 152/418 |
| 2013/0228258 A1 * | 9/2013 | Knapke et al. | 152/415 |
| 2014/0023518 A1 * | 1/2014 | O'Brien et al. | 417/1 |
| 2014/0261941 A1 * | 9/2014 | Knapke et al. | 152/417 |
| 2015/0007920 A1 * | 1/2015 | Tanno | 152/416 |
| 2015/0013866 A1 * | 1/2015 | Tanno | 152/417 |
| 2015/0047764 A1 * | 2/2015 | Tiziani et al. | 152/417 |
| 2015/0059945 A1 * | 3/2015 | Flory et al. | 152/417 |
| 2015/0059946 A1 * | 3/2015 | Keeney et al. | 152/417 |
| 2015/0059947 A1 * | 3/2015 | Power et al. | 152/419 |
| 2015/0068654 A1 * | 3/2015 | Lewandowski et al. | 152/419 |
| 2015/0075688 A1 * | 3/2015 | Keeney et al. | 152/417 |
| 2015/0101722 A1 * | 4/2015 | Lakin et al. | 152/417 |
| 2015/0101723 A1 * | 4/2015 | Keeney et al. | 152/423 |
| 2015/0165846 A1 * | 6/2015 | Sidders et al. | 152/423 |

FOREIGN PATENT DOCUMENTS

| | | |
|---|---|---|
| JP | 2007-191056 | 8/2007 |
| JP | 2009-056948 | 3/2009 |
| JP | 2012-011905 | 1/2012 |
| WO | WO 2007/083514 | 7/2007 |

* cited by examiner

WHEEL AND AIR PRESSURE ADJUSTING DEVICE

TECHNICAL FIELD

The present technology relates to a wheel and an air pressure adjusting device, and more specifically relates to a wheel and an air pressure adjusting device having a simple structure.

BACKGROUND

An air pressure adjusting device adjusts the air pressure of pneumatic tires mounted on a vehicle. While the vehicle is traveling, the air pressure adjusting device adjusts the air pressure of the pneumatic tires based on a target air pressure calculated according to the travel conditions of the vehicle (for example, vehicle velocity, travel route, road surface conditions, and the like). By so doing, running performance and fuel consumption of the vehicle are improved. A known conventional air pressure adjusting device of this type is the art described in Japanese Unexamined Patent Application Publication No. 2009-056948. A conventional air pressure adjusting device has an air passage in the wheel for introducing compressed air into a pneumatic tire.

SUMMARY

The present technology provides a wheel and an air pressure adjusting device having a simple structure.

The wheel according to the present technology is a wheel formed by attaching a rim and a hub mounting part via an attaching portion, having a pneumatic tire mounted on the rim, and mounted on a vehicle by the hub mounting part, the wheel comprising an air passage that penetrates through the attaching portion and opens on the outer circumferential surface of the rim and the mounting surface of the hub mounting part.

Further, the air pressure adjusting device according to the present technology comprises the wheel, a pressurizing and depressurizing pump that connects to the opening on the hub mounting part side of the air passage of the wheel and increases or decreases the air pressure of a pneumatic tire mounted on the wheel, a pressure sensor that detects the air pressure of the pneumatic tire, and a control unit that drives and controls the pressurizing and depressurizing pump based on an output signal from the pressure sensor.

In the wheel and the air pressure adjusting device according to the present technology, when increasing the air pressure of the pneumatic tire, the air passage of the wheel serves as an air introduction path from the outside (pressurizing and depressurizing pump of the air pressure adjusting device) to an air chamber, and when decreasing the air pressure of the pneumatic tire, it serves as an exhaust path from the air chamber to the outside. As a result, because an air passage that can pass air in two directions is formed inside the attaching portion, there is the advantage that the configuration of the wheel can be simplified compared to a configuration in which piping for the air passages is disposed outside the wheel.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, the multiple modified examples described in the embodiment can be combined as desired within the scope apparent to a person skilled in the art.

Air Pressure Adjusting Device

Figure 1:
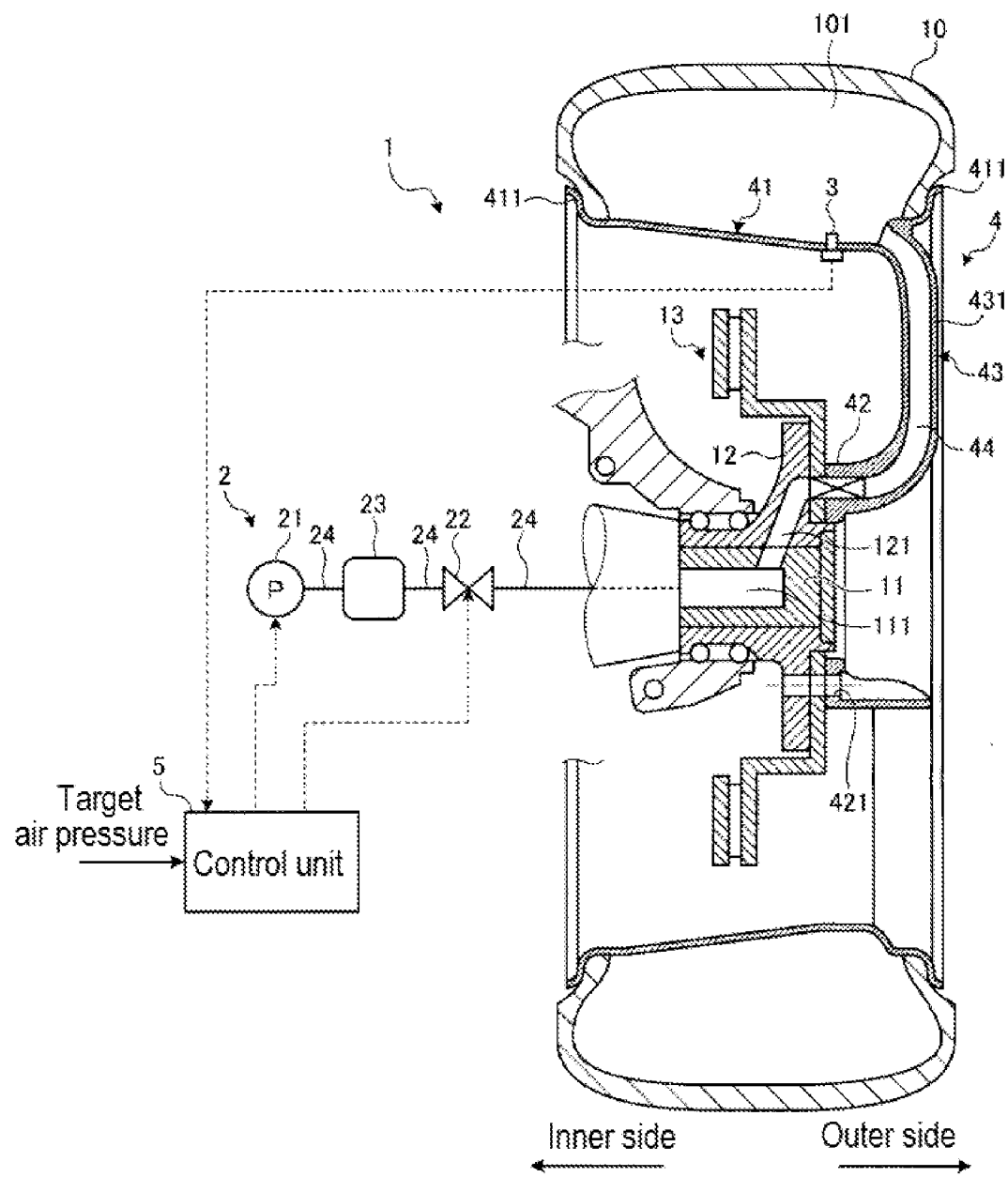
FIG. 1 is a configuration diagram illustrating an air pressure adjusting device according to an embodiment of the present technology.

FIG. 1 is a configuration diagram illustrating an air pressure adjusting device according to an embodiment of the present technology. The diagram illustrates an air pressure adjusting device 1 installed in a vehicle (not illustrated).

The air pressure adjusting device 1 adjusts the air pressure of a pneumatic tire 10, and comprises a pressurizing and depressurizing pump 2, a pressure sensor 3, a wheel 4 and a control unit 5 (see FIG. 1). Here, the case where the air pressure adjusting device 1 adjusts the air pressure of the pneumatic tire 10 mounted on a vehicle will be described. A system that rotates together with a vehicle drive shaft 11, a hub 12, a wheel 4, and the pneumatic tire 10 is called a rotating system, and a system on the vehicle body side (not illustrated) is called a static system while the vehicle is traveling. Further, reference numeral 13 of FIG. 1 is a disk brake rotor.

The pressurizing and depressurizing pump 2 pressurizes and depressurizes the air that fills the pneumatic tire 10. The pressurizing and depressurizing pump 2 is formed by connecting a pressure pump 21, a valve assembly 22, and an air tank 23 via pneumatic piping 24, and is installed in the rotating system of the vehicle. Further, the pressurizing and depressurizing pump 2 is connected to an air passage 44 of the wheel 4 via the pneumatic piping 24, an air passage 111 of the drive shaft 11, and an air passage 121 of the hub. The pressure pump 21 intakes external air and generates compressed air, and is connected to the air tank 23. The valve assembly 22 is a valve that opens and closes the pneumatic piping 24, and is disposed between the air tank 23 and the air passage 111 of the drive shaft 11. The air tank 23 is a tank that stores compressed air, and is disposed between the pressure pump 21 and the valve assembly 22. The air passage 44 of the wheel 4 will be described later.

The pressure sensor 3 detects the air pressure of the air chamber 101 of the pneumatic tire 10, and is installed on the wheel 4 and rotates together with the wheel 4.

The wheel 4 is a wheel for a vehicle which has a pneumatic tire 10 mounted on it and is installed on a vehicle. It is affixed by fastening bolts to the vehicle hub 12. The detailed configuration of the wheel 4 will be described later.

The control unit 5 drives and controls the pressure pump 21 and the valve assembly 22 of the pressurizing and depressurizing pump 2 based on a signal pertaining to the target air pressure of the pneumatic tire 10 (for example, a signal from a vehicular electronic control unit (ECU) or a dedicated air pressure control unit installed in the vehicle) and a signal from the pressure sensor 3. The control unit 5 consists of, for example, a central processing unit (CPU), random access memory (RAM), read only memory (ROM), and the like. The control unit 5 is installed in the static system of the vehicle, and is electrically connected respectively to the pressure pump 21, the valve assembly 22, and the pressure sensor 3, which are in the rotating system. As a result, the signal transmission routes between the control unit 5 and the pressure pump 21, the valve assembly 22, and the pressure sensor 3 are assured, and the power transmission routes from the battery (not illustrated) in the vehicle to the pressure pump 21, the valve assembly 22, and the pressure sensor 3 are assured.

For example, the control unit 5 in the static system and the pressure pump 21, the valve assembly 22, and the pressure sensor 3 in the rotating system are electrically connected respectively via a main terminal and a plurality of sets of static terminals and rotating terminals (not illustrated). Specifically, the main terminal and each of the static terminals are installed in the static system of the vehicle. Also, each of the static terminals consists of a ring-shaped conductor, and is arranged in sequence and supported on the main terminal. Each rotating terminal is installed in the rotating system of the vehicle. Each of the static terminals and each of the rotating terminals are connected via slip rings such that they can slide relative to each other. As a result, the electrical connections between the control unit 5 in the static system and the pressure pump 21, the valve assembly 22, and the pressure sensor 3 in the rotating system are assured while the vehicle is traveling.

Not being limited to the above configuration, the pressure pump 21, the valve assembly 22, and the air tank 23 may also be installed in the body of the vehicle which is the static system (not illustrated). In such a case, the pressure pump 21, the valve assembly 22, and the air tank 23 in the static system and the air passages 44, 111, and 121 in the rotating system are connected via, for example, air universal joints. As a result, the flow channels of compressed air from the pressure pump 21 to the air passage 44 of the wheel 4 are assured.

In this air pressure adjusting device 1, while the vehicle is traveling, the vehicular ECU or a dedicated air pressure control device (not illustrated) mounted in the vehicle inputs a signal pertaining to the target air pressure of the pneumatic tire 10 to the control unit 5. The target air pressure is set as appropriate according to the travel conditions of the vehicle (for example, vehicle velocity, travel route, road surface conditions, and the like). The control unit 5 drives and controls the pressure pump 21 and valve assembly 22 of the pressurizing and depressurizing pump 2 based on the signal pertaining to the target air pressure and the signal from the pressure sensor 3. As a result, the air pressure of the pneumatic tire 10 is adjusted, and the running performance and fuel consumption of the vehicle are improved.

For example, when increasing the air pressure of the pneumatic tire 10, the control unit 5 drives the pressure pump 21 and opens the valve assembly 22. As a result, the pressure pump 21 generates compressed air and supplies it to the air tank 23, and this compressed air is supplied to the air chamber 101 of the pneumatic tire 10 via the pneumatic piping 24, the air passage 111 of the drive shaft 11, the air passage 121 of the hub 12, and the air passage 44 of the wheel 4. When the actual air pressure of the air chamber 101 reaches the target air pressure, the control unit 5 closes the valve assembly 22 and stops the pressure pump 21. On the other hand, when decreasing the air pressure of the pneumatic tire 10, the control unit 5 opens the valve assembly 22 and stops the pressure pump 21. As a result, the air of the air chamber 101 is exhausted via the air passage 44 of the wheel 4, the pneumatic piping 24, the air passage 121 of the hub 12, and the air passage 111 of the drive shaft 11. When the actual air pressure of the air chamber 101 reaches the target air pressure, the control unit 5 closes the valve assembly 22. By this means, the air pressure of the pneumatic tire 10 is adjusted up and down.

In the configuration of FIG. 1, the air of the air chamber 101 is exhausted via the valve assembly 22 of the pressurizing and depressurizing pump 2, as described above. However, not being limited to the above configuration, a valve assembly for exhaust (not illustrated) different from the valve assembly 22 of the pressurizing and depressurizing pump 2 may be installed in the wheel 4, and the air of the air chamber 101 may be exhausted via that valve assembly.

Further, in the configuration of FIG. 1, the pressure sensor 3 is installed in the wheel 4 which is the rotating system, and the air pressure of the air chamber 101 is measured directly, as described above. Such a configuration is preferred due to being failsafe. However, not being limited to the above configuration, the pressure sensor 3 may also be disposed in, for example, the air passage 111 of the drive shaft 11, the air passage 121 of the hub 12, or the air passage 4 of the wheel 4 (not illustrated). Furthermore, for example, in a configuration (not illustrated) in which the pressurizing and depressurizing pump 2 is installed on the vehicle body side, which is the static system, the pressure sensor 3 may be installed in both the pressurizing and depressurizing pump 2 and the static system (not illustrated). With such a configuration, it is easy to supply power to the pressure sensor 3.

Furthermore, the air pressure adjusting device 1 may have a plurality of sets of units made up of the above-described pressurizing and depressurizing pump 2, the pressure sensor 3, and the wheel 4 (not illustrated). For example, if the air pressure adjusting device 1 is used in a four-wheel car, a unit consisting of a pressurizing and depressurizing pump 2, a pressure sensor 3, and a wheel 4 is installed in each of the wheels. One control unit 5 installed in the vehicle body drives and controls each of the pressurizing and depressurizing pumps 2 based on a signal from each of the pressure sensors 3. As a result, the air pressure of the pneumatic tires 10 mounted on each of the wheels can be controlled simultaneously and mutually independently.

Wheel

Figure 2:
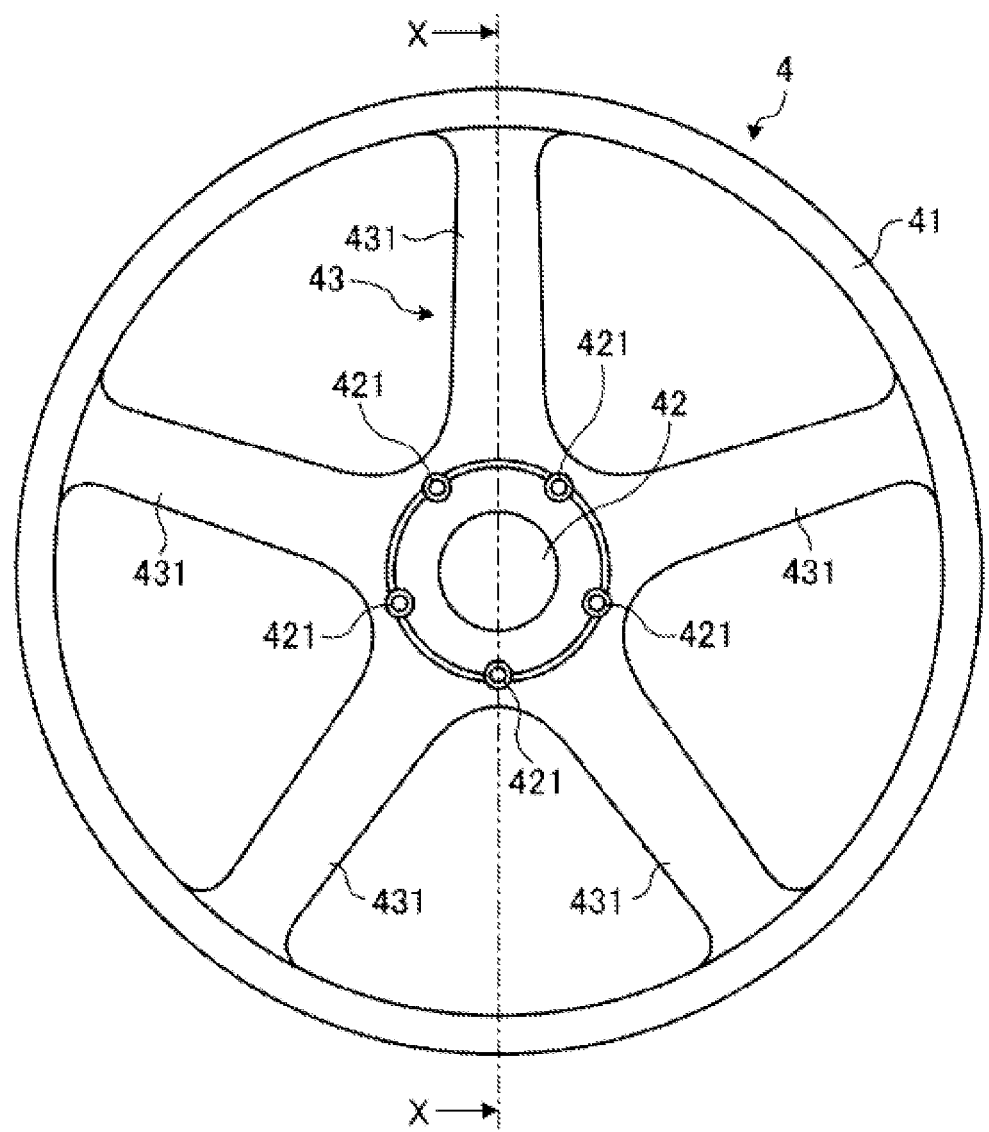
FIG. 2 is an explanatory diagram illustrating the wheel depicted in FIG. 1.
Figure 3:
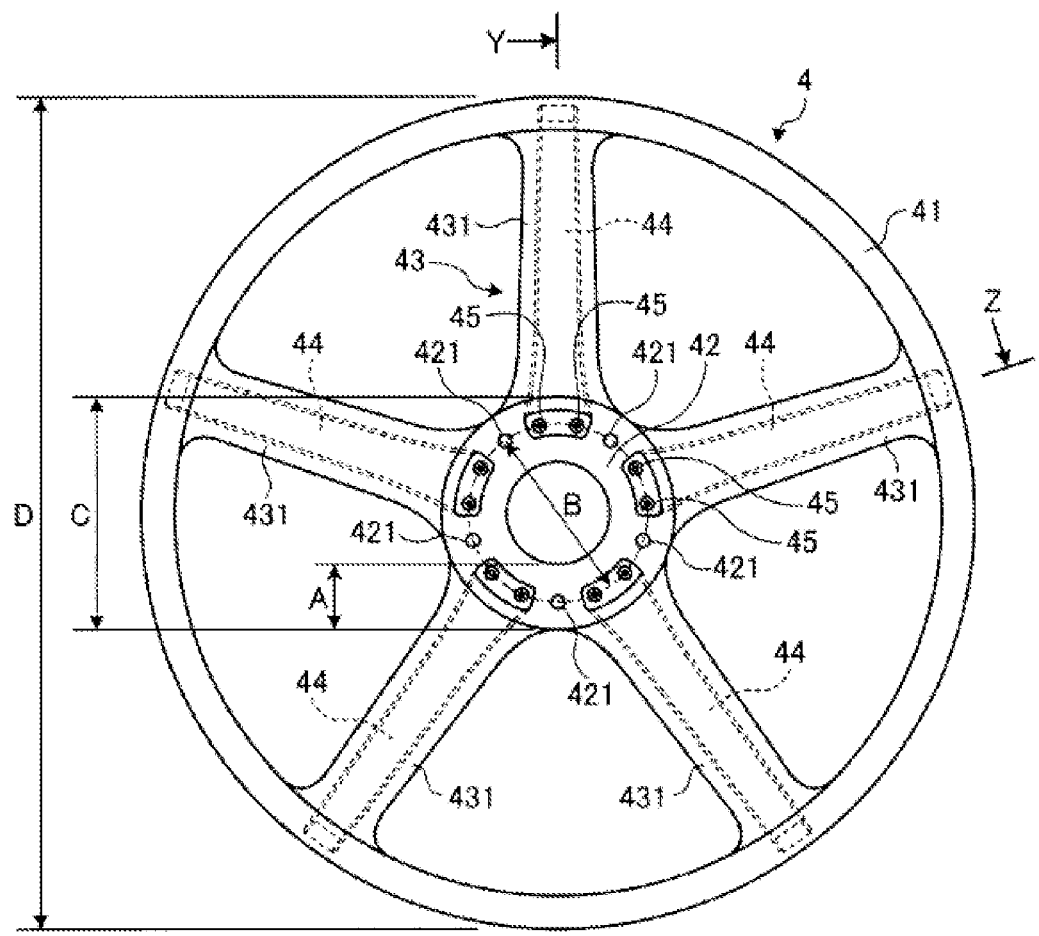
FIG. 3 is an explanatory diagram illustrating the wheel depicted in FIG. 1.
Figure 4:
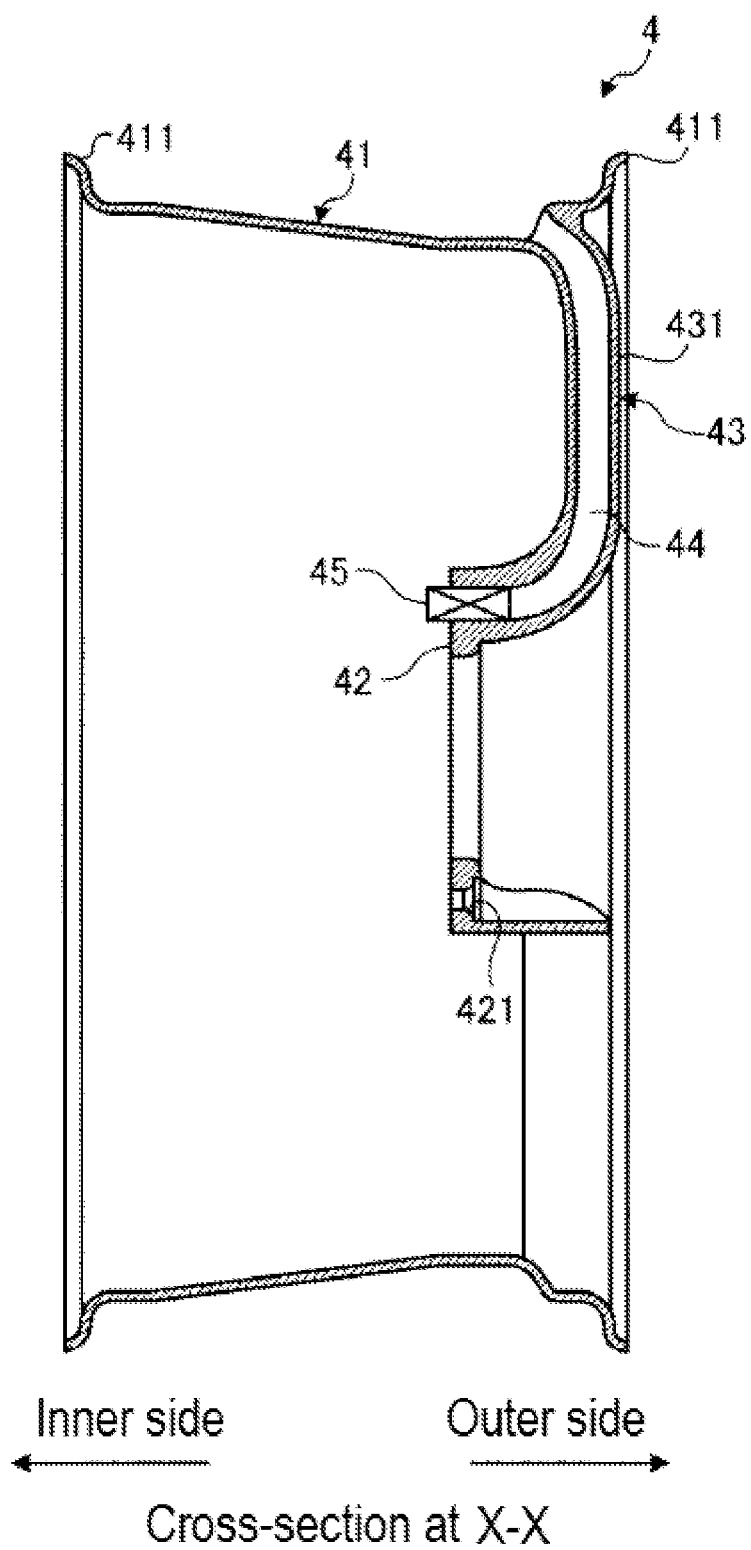
FIG. 4 is an explanatory diagram illustrating the wheel depicted in FIG. 1.

FIGS. 2 to 4 are explanatory diagrams illustrating the wheel 4 depicted in FIG. 1. In these diagrams, FIGS. 2 and 3 illustrate a plan view of the outer side and a plan view of the inner side, respectively, of the wheel 4. FIG. 4 illustrates a cross-section at X-X of the wheel 4.

The wheel 4 comprises a rim 41, a hub mounting part 42, and an attaching portion 43 (see FIGS. 2 to 4). The wheel 4 is made of, for example, cast aluminum, forged aluminum, resin, a composite of resin and aluminum, or the like. Particularly, if resin is used, the wheel 4 is preferably made of resin containing short reinforcing fibers, and heat-curable resin is more preferred.

The rim 41 has a ring-shaped structure, and has flanges 411 on the left and right edges (see FIG. 4). The pneumatic tire 10 is mounted on the wheel 4 by fitting onto the flanges 411 (see FIG. 1). Furthermore, with the pneumatic tire 10 in the inflated state, the air chamber 101 is formed between the outer circumferential surface of the rim 41 and the inner circumferential surface of the pneumatic tire 10.

The hub mounting part 42 has a ring-shaped structure and constitutes a rotational axis of the wheel 4 (see FIGS. 3 and 4). The wheel 4 is mounted on the vehicle hub 12, with the end surface of the inner side of the hub mounting part 42 as a mounting surface (see FIG. 1). Also, the hub mounting part 42 has a plurality of bolt holes 421, and is mounted on the vehicle hub 12 via bolts (not illustrated) inserted in these bolt holes 421.

The attaching portion 43 attaches the rim 41 and hub mounting part 42, and is constructed from, for example, a plurality of spokes 431 (see FIG. 2) or a single disk (not illustrated). If the attaching portion 43 is made up of a plurality of spokes 431, it is preferred that at least four spokes 431 are disposed. For example, in the configurations of FIGS. 2 to 4, the wheel 4 is a spoke wheel, and the attaching portion 43 has five spokes 431 which extend radially.

Air Passages of Wheel

The wheel 4 also has air passages 44 that penetrate through the attaching portion 43 and open on the outer circumferential surface of the rim 41 and the mounting surface of the hub mounting part 42 (see FIGS. 3 and 4).

The air passage 44 constitutes a portion of the air passage that connects the pressurizing and depressurizing pump 2 of the air pressure adjusting device 1 and the air chamber 101 of the pneumatic tire 10 (see FIG. 1). The air passage 44 also serves as an air introduction path from the pressurizing and depressurizing pump 2 to the air chamber 101 (when increasing the air pressure of the pneumatic tire 10), and also as an exhaust path from the air chamber 101 to the outside (when decreasing the air pressure of the pneumatic tire 10). For this reason, a check valve is not disposed at the opening of the air passage 44 on the outer circumferential surface of the rim 41, and air can flow through in both directions.

In the configuration in which the attaching portion 43 is made up of a plurality of spokes 431 (see FIG. 3), it is preferred that the air passages 44 are formed inside these spokes 431. In this case, the required flow path cross-sectional area can be properly assured by the plurality of spokes 431 having air passages 44. On the other hand, if the attaching portion 43 is made of a disk (not illustrated), the air passages 44 are formed inside the disk.

For example, in the configurations of FIGS. 2 to 4, the attaching portion 43 of the wheel 4 is made up of five spokes 431, and each of the spokes 431 has an air passage 44 that is independent of the others (see FIG. 3). Specifically, each of the spokes 431 has an air passage 44 inside of it by means of it having a hollow structure. Further, each air passage 44 opens at the base of the flange 411 on the outer side of the rim 41 of the outer circumferential surface of the rim 41 (see FIG. 4). In this case, the openings of the air passages 44 face from the outer side to the inner side of the rim 41, while the edges of the openings are disposed along the outer circumferential surface of the rim 41. As a result, each of the air passages 44 is configured such that air introduced from each of the air passages 44 into the air chamber 101 flows along the outer circumferential surface of the rim 41.

Further, the air passages 44 of each of the spokes 431 open on the mounting surface of the hub mounting part 42 (see FIG. 3). Additionally, the bolt holes 421 for fastening the hub mounting part 42 to the vehicle hub 12 are formed. The number of openings of the air passages 44 is equal to the number of bolt holes 421. The openings of the air passages 44 and the bolt holes 421 are disposed alternately and at equal intervals around the rotational axis of the hub mounting part 42.

Figure 5:
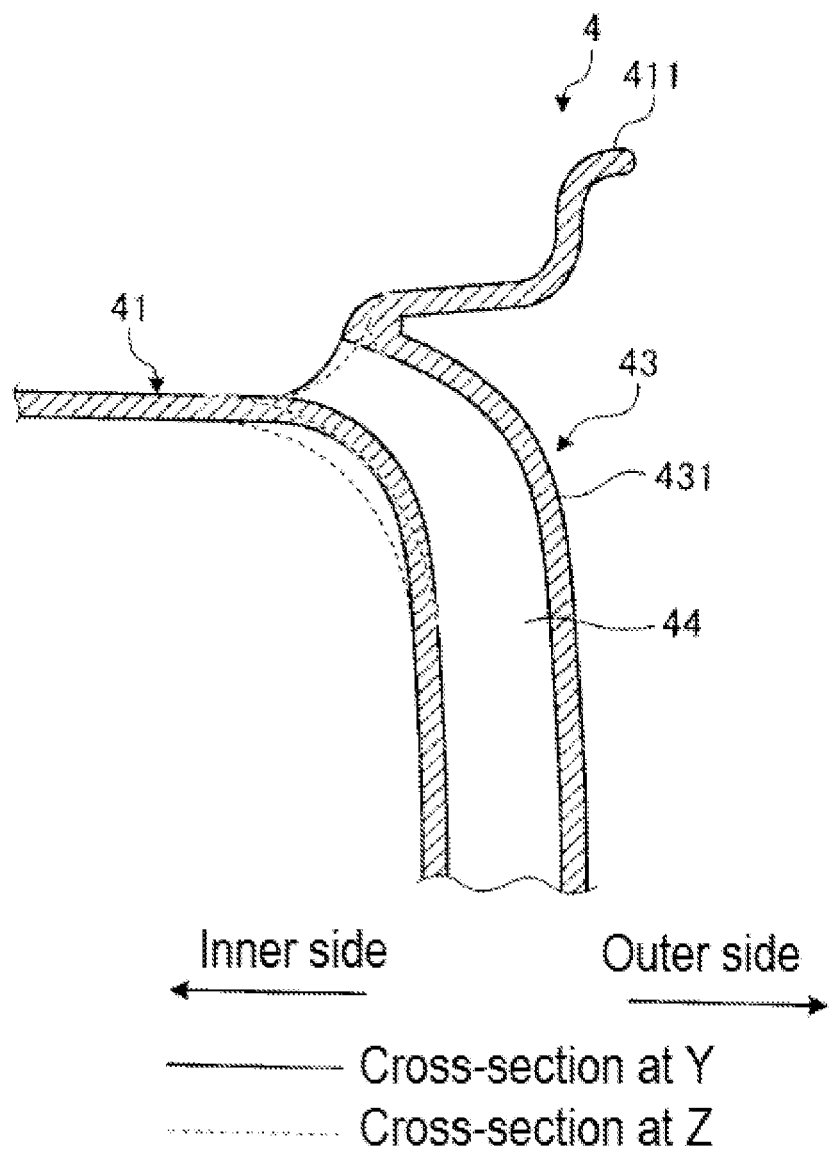
FIG. 5 is an explanatory diagram illustrating the wheel depicted in FIG. 1.

FIG. 5 is an explanatory diagram illustrating the wheel 4 depicted in FIG. 1. The diagram illustrates a cross-section at Y (solid line) and a cross-section at Z (dashed line) of the opening on the rim 41 side in the air passage 44 of the wheel 4 depicted in FIG. 3.

As described above, in the configurations of FIGS. 3 and 4, the air passage 44 has a plurality of openings on the outer circumferential surface of the rim 41. In this case, it is preferred that the openings of the air passage 44 have mutually different cross-sectional shapes. By this means, the frequency of the air column resonance arising from the installation of the air passages 44 is dispersed, and the noise level is reduced.

For example, in the configuration of FIG. 5, the openings of each of the air passages 44 have mutually different opening cross-sectional areas and tube lengths, and the openings are disposed so that the opening directions are mutually different. In this case, the openings of each of the air passages 44 are given mutually different cross-sectional shapes by changing the interior shape of the rim 41 and the wall shape of the inner side of the attaching portion 43, without changing the wall shape of the outer side of the wheel 4. On the other hand, due to the fact that the minimum value of the flow path cross-sectional area of each of the air passages 44 is set at a constant value, the flow rates of each of the air passages 44 are the same.

The flow path cross-sectional area S of the air passages 44 is preferably in the range of 100 mm²≤S≤3000 mm². Specifically, the flow path cross-sectional area when the valve assembly 22 of the pressurizing and depressurizing pump 2 is open, the flow path cross-sectional area of the air passage 111 of the drive shaft 11, the flow path cross-sectional area of the air passage 121 of the hub 12, and the flow path cross-sectional area S of the air passages 44 are each preferably in the range of at least 100 mm² and at most 3000 mm². These flow path cross-sectional areas are more preferably in the range of not less than 120 mm² and not more than 2500 mm², and even more preferably in the range of not less than 150 mm² and not more than 2000 mm². As a result, the flow path cross-sectional areas of the air passages are made appropriate.

In the above-described configuration, the radial-direction width A of the mounting surface of the hub mounting part 42 is preferably in the range of 35 mm≤A≤100 mm (see FIG. 3). The radial-direction width A is more preferably in the range of 37 mm≤A≤90 mm, and even more preferably in the range of 40 mm≤A≤80 mm.

The pitch diameter B of the bolt holes 421 on the mounting surface of the hub mounting part 42 is preferably in the range of 100 mm≤B≤280 mm (see FIG. 3). The pitch diameter B is more preferably in the range of 110 mm≤B≤260 mm, and even more preferably in the range of 115 mm≤B≤240 mm.

The diameter C of the mounting surface of the hub mounting part 42 is preferably in the range of 140 mm≤C≤300 mm (see FIG. 3). The diameter C is more preferably in the range of 145 mm≤C≤280 mm, and even more preferably in the range of 150 mm≤C≤260 mm.

These dimensions A to C are generally set forth by the relationship between the hub mounting part 42 and the vehicle hub 12. By means of these dimensions A to C being in the aforementioned ranges, the area of arrangement of the openings of the air passages 44 and the bolt holes 421 on the mounting surface of the hub mounting part 42 is properly assured. Further, the relationship between the hub mounting part 42 and vehicle hub 12 can be made appropriate.

Air Connection Valve of Wheel

Figure 6:
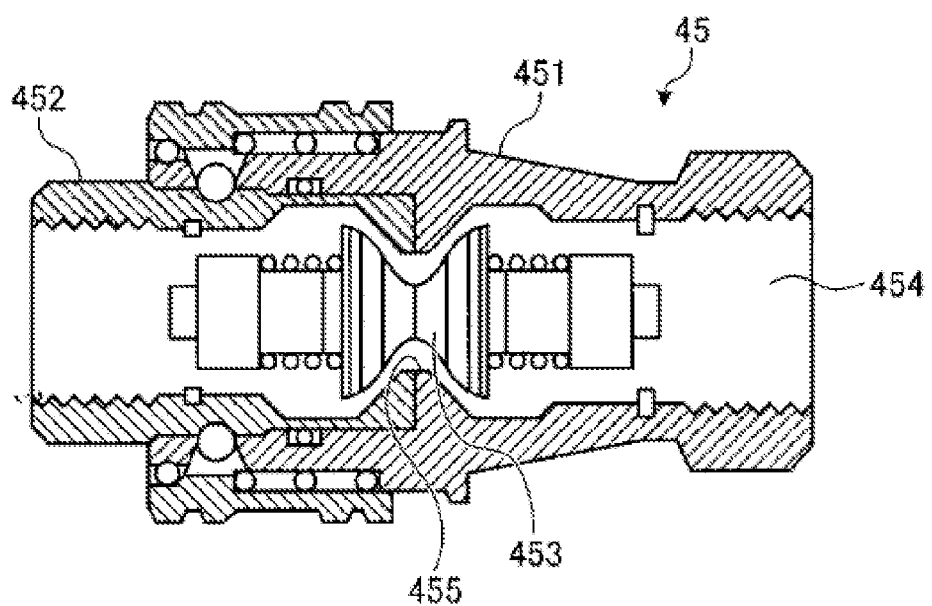
FIG. 6 is an axial-direction cross-sectional view illustrating an air connection valve of the wheel depicted in FIG. 2.

FIG. 6 is an axial-direction cross-sectional view of an air connection valve 45 of the wheel 4 depicted in FIG. 3. The diagram illustrates the state where the air connection valve 45 is open. The structure of FIG. 6 is an example, and is not limited thereto.

The wheel 4 comprises an air connection valve (air coupler) 45 on the opening on the hub mounting part 42 side of the air passage 44 (see FIGS. 3, 4, and 6).

As illustrated in FIG. 6, the air connection valve 45 has a plug 451, a socket 452, and a valve 453. The plug 451 and the socket 452 have short tubular structures. The plug 451 is inserted in the socket 452 such that it can advance and retreat, and it can elastically move in the axial direction via a coil spring. Inside the air connection valve 45, an air passage 454 is formed by the tubular structure of the plug 451 and socket 452. A reduced-diameter part 455 formed by reducing the inside diameter of the plug 451 and socket 452 is formed in the air passage 454. The valve 453 opens and closes the air passage 454, and is interposed in both the plug 451 and the socket 451 and can advance and retreat in the axial direction. By engaging with the reduced-diameter part 455 in the air passage 454, the valve 453 seals the air passage 454 (not illustrated). Further, the valve 453 opens the air passage 454 by separating from the reduced-diameter part 455 (see FIG. 6). The air connection valve 45 is affixed by means of the plug 451 (or socket 452) being fit into the opening on the hub mounting part 42 side of the air connection passage 44, and the socket 452 (or plug 451) is disposed protruding from the mounting surface of the hub mounting part 42.

In the air connection valve 45, in the state where the wheel 4 is mounted on the vehicle hub 12 (see FIG. 1), the plug 451 is pushed into the socket 452 by means of the plug 451 being pushed against the hub 12 (see FIG. 6). In this state, the valve 453 separates from the reduced-diameter part 455, and the air connection valve 45 is opened. As a result, the opening on the hub mounting part 42 side of the air passage 44 of the wheel 4 is opened, and the air passage 44 connects through. As a result, compressed air can be supplied from the pressurizing and depressurizing pump 2 to the air chamber 101 of the pneumatic tire 10, or air can be exhausted from the air chamber 101 to the outside.

On the other hand, in the state where the wheel 4 has been removed from the vehicle hub 12 (see FIG. 4), the plug 451 is pushed out from the socket 452 and moves in the axial direction, and the valve 453 presses against the reduced-diameter part 455 of the plug 451 and socket 452 (not illustrated). In this state, the valve 453 and the reduced-diameter part 455 engage, and the air connection valve 45 is closed. As a result, the opening on the hub mounting part 42 side of the air passage 44 is sealed, and the air passage 44 is blocked. As a result, when inflating the pneumatic tire 10 and mounting it on the vehicle, for example, an assembly of the pneumatic tire 10 and the wheel 4 can be transported with the pneumatic tire 10 already filled with air.

In the configuration of FIG. 3, the five spokes 431 of the wheel 4 have mutually independent air passages 44, and an air connection valve 45 is disposed at each opening on the hub mounting part 42 side of each of the air passages 44. Additionally, two air connection valves 45 are disposed at the opening of one air passage 44. As a result, the flow path cross-sectional area of the air passages 44 is assured while the function of the air connection valves 45 is also assured.

Effect

As described above, the wheel 4 is formed by attaching the rim 41 and the hub mounting part 42 via the attaching portion 43 (see FIGS. 2 to 4). Further, the wheel 4 has a pneumatic tire 10 mounted on the rim 41, and is mounted on the vehicle hub 12 by the hub mounting part 42 (see FIG. 1). Further, the wheel 4 comprises an air passage 44 that penetrates through the attaching portion 43 and opens on the outer circumferential surface of the rim 41 and the mounting surface of the hub mounting part 42.

With such a configuration, when increasing the air pressure of the pneumatic tire 10, the air passage 44 of the wheel 4 serves as an air introduction path from the outside (pressurizing and depressurizing pump 2 of the air pressure adjusting device 1) to the air chamber 101, and when decreasing the air pressure of the pneumatic tire 10, it serves as an exhaust path from the air chamber 101 to the outside (see FIG. 1). As a result, because the air passage 44 that can pass air in two directions is formed inside the attaching portion 43, there is the advantage that the configuration of the wheel 4 can be simplified compared to a configuration in which piping for the air passage is disposed outside the wheel (not illustrated).

Further, the wheel 4 comprises a plurality of mutually independent air passages 44 (see FIG. 3). As a result, it has the advantage of having a failsafe mechanism because even if any of the air passages 44 fails, air can pass through via the other air passages 44.

The wheel 4 also comprises an air connection valve (air coupler) 45 that opens the air passages 44 when the wheel 4 is mounted on a vehicle and closes the air passages 44 when the wheel 4 stands alone (see FIGS. 1, 3, 4, and 6). With such a configuration, in the state where the wheel 4 is mounted on the vehicle hub 12 (see FIG. 1), the air passages 44 connect through, and there is the advantage that compressed air can be supplied from the pressurizing and depressurizing pump 2 to the air chamber 101 of the pneumatic tire 10, or, there is the advantage that air can be exhausted from the air chamber 101 to the outside. On the other hand, in the state where the wheel 4 has been removed from the vehicle hub 12 (see FIG. 4), the air passages 44 are blocked, and therefore, there is the advantage that when inflating the pneumatic tire 10 and mounting it on the vehicle, for example, an assembly of the pneumatic tire 10 and wheel 4 can be transported with the pneumatic tire 10 already filled with air.

Further, on the wheel 4, the attaching part 43 has spokes 431, and has air passages 44 inside the spokes 431 (see FIGS. 3 and 4). As a result, there is the advantage that the air passages 44 can be formed without diminishing the appearance of the wheel 4.

Further, on the wheel 4, the attaching part 43 has a disk, and has air passages 44 inside the disk (not illustrated). As a result, there is the advantage that the air passages 44 can be formed without diminishing the appearance of the wheel 4.

Also, in the wheel 4, the hub mounting part 42 has a plurality of bolt holes 421 and is mounted on the vehicle hub 12 via bolts (not illustrated) inserted in the bolt holes 421 (see FIG. 1). Further, the attaching part 43 has a plurality of air passages 44. On the mounting surface of the hub mounting part 42, the bolt holes 421 and the openings of the air passages 44 are alternately disposed around the rotational axis of the hub mounting part 42 (see FIG. 3). Therefore, with such a configuration, because the bolt holes 421 and the openings of the air passages 44 are alternately disposed around the rotational axis of the hub mounting part 42, there are the advantages that the rigidity of the hub mounting part 42 is appropriately assured, and fastening the bolts of the hub mounting part 42 is easy.

In the wheel 4, the air passage 44 has a plurality of openings on the outer circumferential surface of the rim 41 (see FIG. 3), and these openings have mutually different cross-sectional shapes (see FIG. 5). As a result, the frequency of the air column resonance arising from the installation of the air passage 44 is dispersed, and there is the advantage that the noise level is reduced.

In the wheel 4, the flow path cross-sectional area S of the air passages 44 is in the range of 100 mm²≤S≤3000 mm² (see FIG. 3). As a result, there is the advantage that the flow path cross-sectional area S of the air passages 44 is made appropriate. That is, due to the fact that S is not less than 100 mm², the quantity of air supplied to and the quantity of air exhausted from the pneumatic tire 10 are properly assured, and therefore there is the advantage that the air pressure of the pneumatic tire 10 can be controlled rapidly. Furthermore, by means of S being less than or equal to 3000 mm², there is the advantage that the wheel 4 does not have to be increased in size.

In the wheel 4, the radial-direction width A of the mounting surface of the hub mounting part 42 is in the range of 35 mm≤A≤100 mm (see FIG. 3). As a result, there is the advantage that the radial-direction width A of the mounting surface of the hub mounting part 42 is made appropriate.

Furthermore, the air pressure adjusting device 1 comprises any of the wheels 4 described above, a pressurizing and depressurizing pump 2 which connects to the openings on the hub mounting part 42 side of the air passages 44 of the wheel 4 and increases or decreases the air pressure of the pneumatic tire 10 mounted on the wheel 4, a pressure sensor 3 that detects the air pressure of the pneumatic tire 10, and a control unit 5 that drives and controls the pressurizing and depressurizing pump 2 based on an output signal from the pressure sensor 3 (see FIG. 1).

With such a configuration, when increasing the air pressure of the pneumatic tire 10, the air passages 44 of the wheel 4 serve as air introduction paths from the pressurizing and depressurizing pump 2 to the air chamber 101, and when decreasing the air pressure of the pneumatic tire 10, they serve as exhaust paths from the air chamber 101 to the outside. As a result, because the air passages 44 that can pass air in two directions are formed inside the attaching portion 43, there is the advantage that the configuration of the air pressure adjusting device 1 can be simplified compared to a configuration in which piping for the air passage is disposed outside the wheel (not illustrated).

What is claimed is:

1. A wheel, formed by attaching a rim and a hub mounting part via an attaching portion, having a pneumatic tire mounted on the rim, and mounted on a vehicle by the hub mounting part, the wheel comprising an air passage that penetrates through the attaching portion and opens on an outer circumferential surface of the rim and a mounting surface of the hub mounting part, the outer circumferential surface of the rim including a flat cylindrical surface portion in an axial direction of the rim, wherein an opening of the air passage on the outer circumferential surface of the rim faces toward the axial direction of the wheel and an inner wall surface of the opening of the air passage is connected to the flat cylindrical surface portion of the rim in a same plane without a step.

2. The wheel according to claim 1, comprising a plurality of the air passages that are mutually independent.

3. The wheel according to claim 1, comprising air connection valves which open the air passages when the wheel is mounted on a vehicle and close the air passages when the wheel stands alone.

4. The wheel according to claim 1, wherein the attaching portion has spokes and has the air passages inside the spokes.

5. The wheel according to claim 4, wherein the attaching portion has at least four spokes which extend radially.

6. The wheel according to claim 1, wherein the attaching portion has a disk and has the air passages inside the disk.

7. The wheel according to claim 1, wherein the hub mounting part has a plurality of bolt holes and is mounted on the vehicle via bolts inserted into the bolt holes, the attaching portion has a plurality of the air passages, and on the mounting surface of the hub mounting part, the bolt holes and the openings of the air passages are alternately disposed around the rotational axis of the hub mounting part.

8. The wheel according to claim 7, wherein a pitch diameter of the bolt holes on the mounting surface of the hub mounting part is in the range of 100 mm≤B≤280 mm.

9. The wheel according to claim 1, wherein the air passages have a plurality of the openings on the outer circumferential surface of the rim, and the plurality of openings have mutually different cross-sectional shapes.

10. The wheel according to claim 9, wherein each of the openings has mutually different opening cross-sectional areas and tube lengths.

11. The wheel according to claim 9, wherein each of the openings is disposed so that the opening directions are mutually different.

12. The wheel according to claim 9, wherein each of the openings has a mutually different interior shape of the rim and a mutually different wall shape of the inner side of the attaching portion.

13. The wheel according to claim 9, wherein a minimum value of a flow path cross-sectional area of each of the openings is set at a constant value.

14. The wheel according to claim 1, wherein the flow path cross-sectional area S of the air passages is in the range of 100 mm²≤S≤3000 mm².

15. The wheel according to claim 1, wherein the radial-direction width A of the mounting surface of the hub mounting part is in the range of 35 mm≤A≤100 mm.

16. An air pressure adjusting device, comprising:

the wheel described in claim 1;

a pressurizing and depressurizing pump that connects to the opening on the hub mounting part side of the air passage of the wheel and increases or decreases the air pressure of the pneumatic tire mounted on the wheel;

a pressure sensor that detects the air pressure of the pneumatic tire; and a control unit that drives and controls the pressurizing and depressurizing pump based on an output signal from the pressure sensor.

17. The air pressure adjusting device of claim 16, wherein the pressure sensor is installed in the wheel and the air pressure of an air chamber of the pneumatic tire is measured directly.

18. The wheel according to claim 1, wherein the wheel comprises a material selected from the group consisting of cast aluminum, forged aluminum, resin, and a composite of resin and aluminum.

19. The wheel according to claim 18, wherein the wheel comprises the resin, the resin being heat-curable and containing short reinforcing fibers.

20. The wheel according to claim 1, wherein the flow path cross-sectional area S of the air passages is in the range of not less than 120 mm² and not more than 2500 mm².

21. The wheel according to claim 1, wherein the flow path cross-sectional area S of the air passages is in the range of not less than 150 mm² and not more than 2000 mm².

22. The wheel according to claim 1, wherein the radial-direction width A of the mounting surface of the hub mounting part is in the range of 37 mm≤A≤90 mm.

23. The wheel according to claim 1, wherein the radial-direction width A of the mounting surface of the hub mounting part is in the range of 40 mm≤A≤80 mm.

24. The wheel according to claim 1, wherein a diameter of the mounting surface of the hub mounting part is in the range of 140 mm≤C≤300 mm.

25. The wheel according to claim 1, wherein a planar surface of the hub mounting part is configured to mate with a planar surface of a hub, wherein the air passage opens on the planar surface of the hub mounting part and is positioned to receive air from an air passage in the hub which opens to the planar surface of the hub.

26. The wheel according to claim 1, comprising a plurality of the air passages that are mutually independent; and a plurality of openings on the outer circumferential surface of the rim that have mutually different cross-sectional shapes.

27. A wheel, formed by attaching a rim and a hub mounting part via an attaching portion, having a pneumatic tire mounted on the rim, and mounted on a vehicle by the hub mounting part, the wheel comprising an air passage that penetrates through the attaching portion and opens on an outer circumferential surface of the rim and a mounting surface of the hub mounting part, wherein a planar surface of the hub mounting part is configured to mate with a planar surface of a hub, wherein the air passages have a plurality of openings on the outer circumferential surface of the rim, and the plurality of openings have mutually different cross-sectional shapes.

28. A wheel, formed by attaching a rim and a hub mounting part via an attaching portion, having a pneumatic tire mounted on the rim, and mounted on a vehicle by the hub mounting part, the wheel comprising an air passage that penetrates through the attaching portion and opens on an outer circumferential surface of the rim and a mounting surface of the hub mounting part, wherein a planar surface of the hub mounting part is configured to mate with a planar surface of a hub, wherein the air passage opens on the planar surface of the hub mounting part and is positioned to receive air from an air passage in the hub which opens to the planar surface of the hub.

* * * * *